(12) United States Patent
Moradnia

(10) Patent No.: US 11,679,823 B2
(45) Date of Patent: Jun. 20, 2023

(54) RETRACTABLE AERODYNAMIC SIDE SKIRTS FOR VEHICLES

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 17/142,803

(22) Filed: Jan. 6, 2021

(65) Prior Publication Data

US 2022/0212731 A1 Jul. 7, 2022

(51) Int. Cl.
*B62D 35/02* (2006.01)
*B62D 35/00* (2006.01)

(52) U.S. Cl.
CPC ........... *B62D 35/02* (2013.01); *B62D 35/008* (2013.01)

(58) Field of Classification Search
CPC ..... B62D 35/001; B62D 35/008; B62D 35/02
USPC ............................... 296/180.1, 180.2, 180.4
See application file for complete search history.

(56) References Cited

U.S. PATENT DOCUMENTS

| | | | |
|---|---|---|---|
| 5,280,990 A | 6/1994 | Rinard | |
| 5,322,340 A | 6/1994 | Sato et al. | |
| 8,731,781 B2 | 5/2014 | Prentice | |
| 8,899,660 B1 | 12/2014 | Praskovskaya et al. | |
| 9,272,741 B2 | 3/2016 | Gerst | |
| 9,932,074 B2 | 4/2018 | Sarhadiangardabad | |
| 9,994,267 B1 | 6/2018 | Marmo et al. | |
| 10,011,232 B2 | 7/2018 | Burton | |
| 10,081,397 B2 | 9/2018 | Bacon | |
| 10,189,517 B2 | 1/2019 | Povinelli et al. | |
| 10,272,957 B2* | 4/2019 | Klop | B62D 37/02 |
| 10,457,340 B2 | 10/2019 | Potvin et al. | |
| 10,471,914 B2 | 11/2019 | Bosco | |
| 2016/0244107 A1 | 8/2016 | Ishiba | |
| 2019/0118871 A1 | 4/2019 | Senatro | |
| 2019/0161123 A1 | 5/2019 | Shen et al. | |
| 2019/0337576 A1 | 11/2019 | Brereton et al. | |
| 2020/0010128 A1 | 1/2020 | Herlem | |
| 2020/0239088 A1 | 7/2020 | Kapetanovic et al. | |
| 2020/0324834 A1* | 10/2020 | Kelly | B62D 37/02 |

FOREIGN PATENT DOCUMENTS

| | | | |
|---|---|---|---|
| CN | 207241830 U | 4/2018 | |
| DE | 4209164 A1 * | 9/1993 | ........... B62D 25/025 |
| DE | 102016011484 A1 | 3/2017 | |
| EP | 1650114 A2 * | 4/2006 | ........... B62D 35/008 |
| FR | 2983451 A1 | 6/2013 | |
| GB | 2528929 A * | 2/2016 | ............... B60R 3/02 |
| JP | 2013091384 A | 5/2013 | |
| KR | 20160118189 A | 10/2016 | |
| WO | 2004062953 A3 | 7/2004 | |
| WO | 2015117940 A1 | 8/2015 | |
| WO | 2016046282 A1 | 3/2016 | |

\* cited by examiner

*Primary Examiner* — Jason S Daniels
(74) *Attorney, Agent, or Firm* — Plumsea Law Group, LLC

(57) ABSTRACT

Apparatuses and methods reducing the amount of drag on a vehicle are provided. In some embodiments, the proposed apparatuses are configured to remain stowed in a sidewall of the vehicle when not in use, thereby maintaining the aesthetic appeal of the vehicle, while in other embodiments the apparatus is static and fixed along the sides of the vehicle. In one example, an aerodynamic apparatus includes a tapered structure, in which an inner side panel is substantially planar, and an outer side panel has a convex curvature.

20 Claims, 16 Drawing Sheets

US 11,679,823 B2

RETRACTABLE AERODYNAMIC SIDE SKIRTS FOR VEHICLES

BACKGROUND

The present disclosure generally relates to structures and systems for manipulating airflow around a vehicle, and, more particularly, to aerodynamic vehicular side skirts that can be retracted at lower speeds, thereby preserving the vehicle's external appearance, and deployed at highway speeds to increase vehicle range.

There is a need in the art for a system that improves the aerodynamic performance of a vehicle without detracting from the outer appearance of the vehicle while stopped or operating at lower speeds.

SUMMARY

The disclosed embodiments provide methods and systems for reducing the amount of air that contacts the tires of a vehicle, thereby reducing the pressure difference between the forward and rear faces of the tire and improving the aerodynamic performance of the vehicle. In addition, since the proposed apparatuses are configured to remain stowed in a sidewall of the vehicle when not in use, they do not detract from the aesthetic appeal of the vehicle.

In one aspect, an aerodynamic apparatus for a vehicle comprises a first side panel and a second side panel joined along a first tapered edge. In addition, an outward-facing surface of the first side panel is substantially planar and an outward-facing surface of the second side panel includes a convex curvature.

Another aspect provides a retractable aerodynamic automotive system configured to reduce aerodynamic drag in a vehicle. The system includes a wedge-shaped first component comprising a first side panel joined to a second side panel along a tapered front edge. The first component is stowed within a first chamber formed in a first side wall of the vehicle when retracted. In addition, the front edge is disposed directly rearward of an inboard wall of a front wheel of the vehicle when the first component is deployed.

Another aspect provides a method of reducing aerodynamic drag on a vehicle. The method includes a first step of receiving, at an onboard computing system for the vehicle, first data, and a second step of determining that the first data matches a condition corresponding to a first type of triggering event. A third step includes deploying, in response to determining a first type of triggering event has occurred, a first aerodynamic apparatus from a chamber formed in a first sidewall of the vehicle. Once the first aerodynamic apparatus is deployed, it extends between a front wheel and rear wheel.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Conventional side skirts have been used as an effective drag-reduction device to control the underbody air flow of some vehicles. They traditionally consist of straight panels curtaining the space between the front and rear wheels areas on the sides of the car. The underbody flow induces considerable drag as it passes through the underside of vehicles and interacts with rolling wheels and other underbody structures. As a result, the vehicle experiences high-pressure zones on forward-facing portions of components (e.g., tire surfaces) and low-pressure zones on rearward-facing portions of components. This pressure differential creates drag on the vehicle. Controlling the amount of aerodynamic drag can be advantageous in achieving enhanced vehicle performance.

However, the typical road car is designed to have a bearable amount of ground clearance for street driving. In addition, most consumers strongly desire that the aesthetic appearance of their vehicle be maintained, discouraging the installation of conventional side skirts that detract from the overall aesthetic appearance of the vehicle. As will be described in greater detail herein, active or dynamically responsive aerodynamic systems can be implemented in which specially designed aerodynamic structures can remain hidden and/or do not otherwise detract from the appearance of the vehicle. The structures can be maintained in a stowed position when the vehicle is parked, reversing, or operating at lower speeds. However, at higher speeds, these structures are configured to deploy from the vehicle door or side wall (e.g., as a side skirt) to improve aerodynamic performance. In some other embodiments, the structures described herein may be installed as permanent or static features of the vehicle, i.e., whereby the aerodynamic system is always in a deployed state.

Figure 1A:
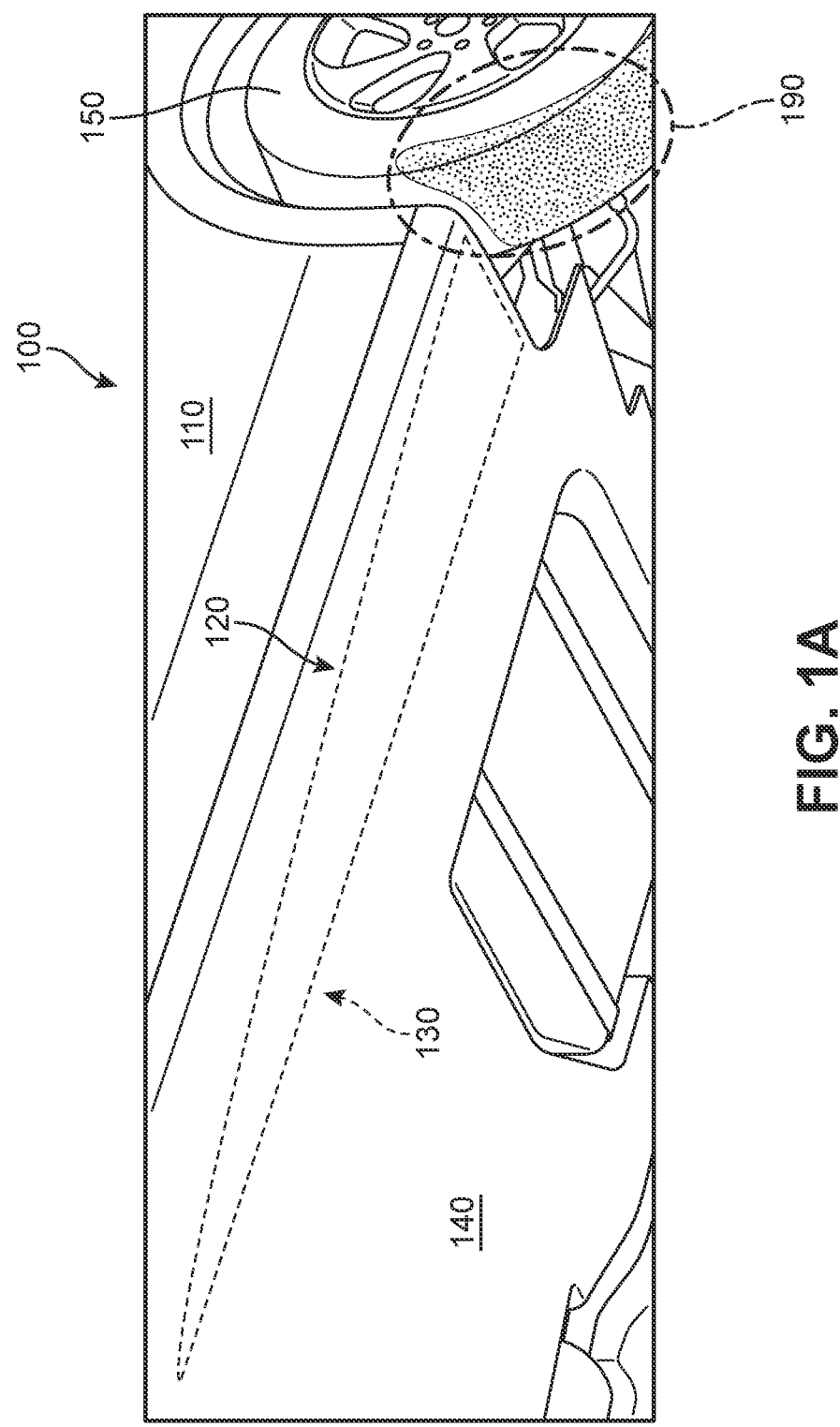
FIGS. 1A and 1B present a sequence in which a vehicle deploys an aerodynamic side skirt apparatus, according to an embodiment.

For purposes of introduction, an overview of one embodiment of the proposed systems and methods is illustrated with reference to FIGS. 1A and 1B. More particularly, an isometric view of a portion of a first vehicle 100, depicting an underbody 140 and first side 110, equipped with a retractable side skirt apparatus ("skirt apparatus") 130 for reduced aerodynamic drag in accordance with an exemplary embodiment of the disclosure herein is shown. In FIG. 1A, the skirt apparatus 130 is illustrated in dotted line to represent its stowed configuration within a compartment 120 formed along the first side wall 110 of first vehicle 100. A rear wheel 150 is disposed directly behind compartment 120. As the first vehicle 100 travels at a first speed without the benefit of a side skirt, the rear wheel tread of rear wheel 150 experiences a first pressure 180 associated with the significant aerodynamic drag being experienced by the tire, illustrated here by a dense cross-hatching. In other words, air flow that passes beneath the vehicle increases the drag force on the vehicle when it impinges on and flows around the vehicle undercarriage or underbody, including components attached to or a part of the underside of a vehicle.

Figure 1B:
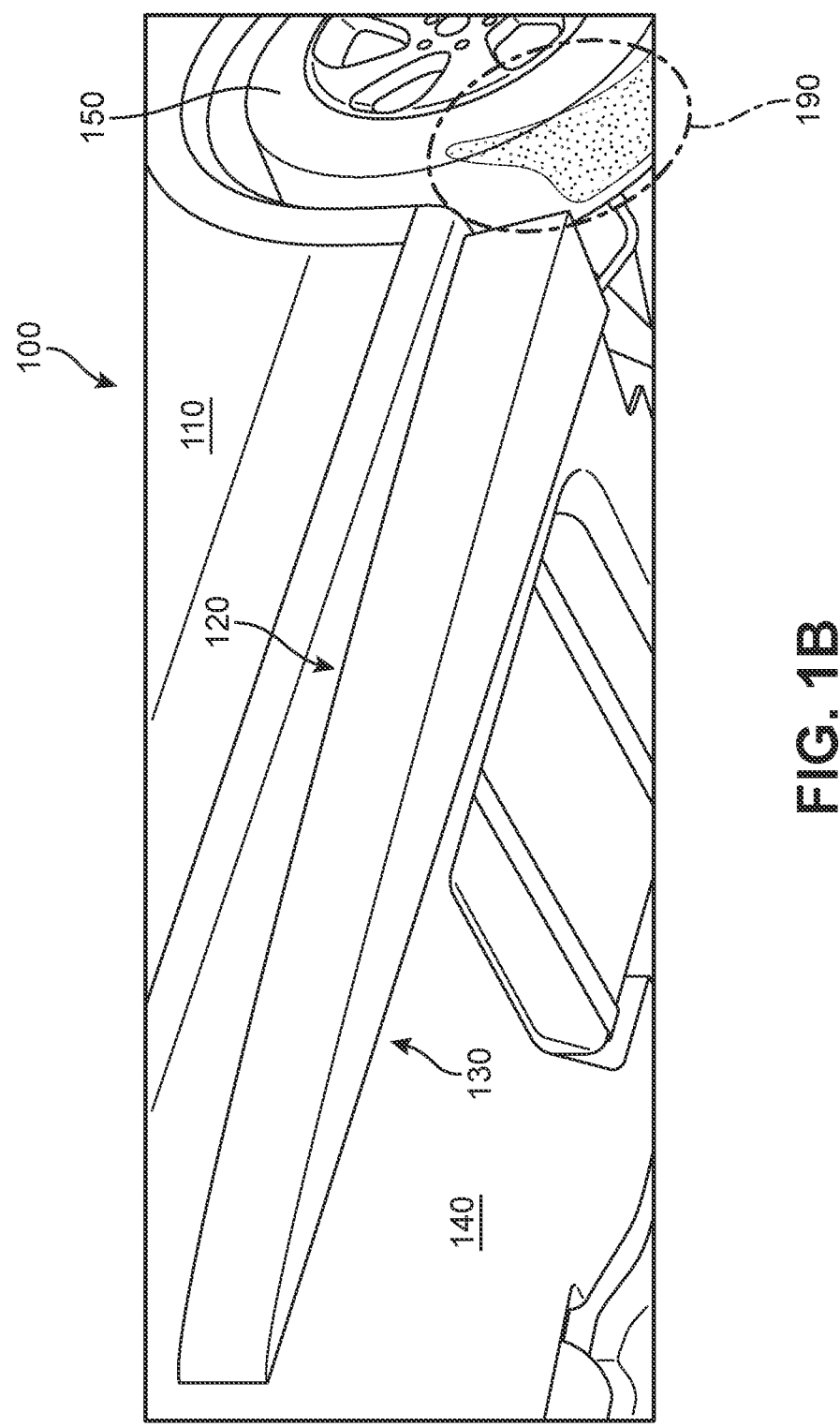

However, as shown in FIG. 1B, when the skirt apparatus 130 is in the deployed configuration, the air flow can be redirected to reduce aerodynamic drag. As illustrated generally here and discussed in greater detail below, the forwardmost tip of the skirt apparatus 130 is substantially aligned with the inboard side of the front wheel. This alignment directs the air exiting the front wheel well outward and away from the rear wheel. In addition, a rearward end of the skirt apparatus 130 has a greater width relative to the forwardmost tip, helping to direct air away from the rear wheel. This rerouting of air-flow away from the rear wheel results in substantially reduced second pressure 190 on the rear wheel tread, here represented by a lighter cross-hatching. Thus, the side skirt apparatus extends downward from a bottom of the vehicle (e.g., a sidewall) and helps to reduce wind flow resistance and drag on a vehicle. Such a reduction on the drag of the vehicle may operate to improve driving range for a wide variety of vehicle types (e.g., gas vehicles, hybrid vehicles, battery-operated vehicles, and alternative fuel-based vehicles, etc.).

Figure 2:
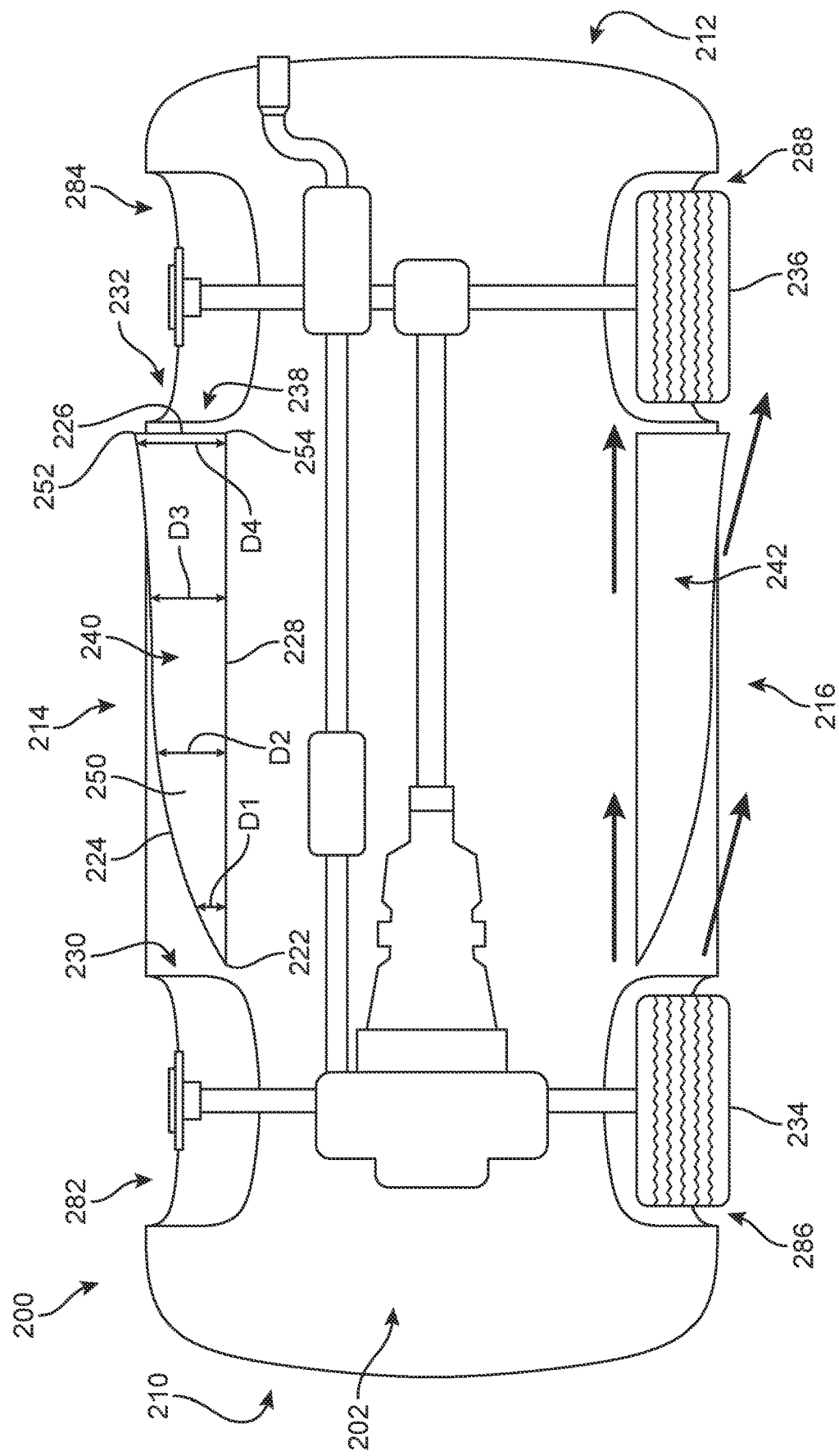
FIG. 2 is a schematic diagram of a vehicle underbody in which two side skirt apparatuses are shown in the extended configuration, according to an embodiment.

As additional context, FIG. 2 presents an illustration of an underbody 202 of a second vehicle 200 in which an embodiment of the proposed aerodynamic system is implemented. As a general matter, the vehicles described herein may refer to an automobile, a car, a racecar, a truck, a van, a sport-utility vehicle (SUV), a motorcycle, an all-terrain vehicle (ATV), a snowmobile, a recreational vehicle, trailer, semi-trailer, or other vehicles, whether or not motorized. In FIG. 2, for purposes of clarity to the reader, the tires of the first vehicle 200 along a first side 214 have been removed to expose the corresponding wheel wells. For example, the first side 214 includes a first wheel well 282 disposed toward a front end 210 of the vehicle (configured to receive a front tire) and a second wheel well 284 disposed toward a rear end 212 of the vehicle (configured to receive a rear tire). On an opposing second side 216, a third wheel well 286 is occupied by a forward tire 234 and a fourth wheel well 288 by a rearward tire 236.

As a general matter, the embodiments disclosed herein include a curved or "scooped" side skirt with a tip or forward end aligned rearward of the front wheel along the inboard wall of the front tire. The skirt expands in width until it terminates just forward of the rear wheel, where the skirt has an inboard side substantially aligned with the inboard wall of the tire and an end portion of the outboard side substantially aligned with the outboard side wall of the tire. In other words, the structure is configured to align the passing airflow with the outer edge of the wheel, directing the air exiting the front wheel well outward and away from the rear wheel. The width of the rear portion of the skirt allows for air from both under the vehicle and outside of the vehicle to be directed away from the rear wheel. Thus, in different embodiments, the airflow is generally aligned with the outer wall of the wheel, and has minimal or no contact with the outer wall or edge of the rear wheel.

It should be appreciated that local flow characteristics can influence how the structural features should be aligned relative to the tire walls. Thus, in some other embodiments, (for example, depending on the local flow characteristic), only one of the surfaces of the skirt may be aligned with a wall of the tire, the skirt may be disposed in an offset arrangement relative to the walls of the tire (i.e., the skirt and tire surfaces are not aligned, yet the airflow remains aligned along the outer edge of the wheel). As one non-limiting example, in an alternate embodiment, a surface of the outboard side of the skirt can extend or protrude further outward (away from a centerline of the vehicle) relative to the outboard side of the wheel. This protruding flare portion is configured to cause airflow to be 'kicked' outward, to then be struck by the side flow.

In some embodiments in which the skirt apparatus is configured as an active system, the skirt apparatuses can extend below a side wall of the vehicle when deployed, at least partially along a length of the vehicle. In particular, as shown in FIG. 2, the skirt system extends generally between the front wheel assembly and the rear wheel assembly of the vehicle. However, in different embodiments, the skirt systems described herein may be modified to extend along a greater or a lesser length of the vehicle than what is illustratively shown in the figures. In other words, the skirt systems disclosed herein may be modified to extend along the entire, or substantially the entire, length of the vehicle or may be modified to extend along only a small portion of the length of the side(s) of the vehicle.

In this example, a side skirt has been deployed along each side of the second vehicle 200, including a first side skirt ("first skirt") 240 extending between the first wheel well 282 and second wheel well 284 along the first side 214, and a second side skirt ("second skirt") 242 extending between the third wheel well 286 and fourth wheel well 288 along the second side 216. For purposes of simplicity, details will only be provided with respect to first skirt 240; however, it can be understood that in some embodiments, the two skirts are substantially similar, and are configured as mirror-image counterparts in both structure, arrangement, and deployment.

An underside of each side skirt can be seen in FIG. 2. More specifically, a bottom panel 250 extending longitudinally between a tip end 222 and a rear panel 226 and laterally between an outer panel 224 and an inner panel 228 faces toward the reader. In some embodiments, the bottom panel 250 has a substantially wing-like shape. In one embodiment, the inner panel 228 and rear panel 226 are approximately orthogonal with respect to one another, while the tip end 222 is the edge formed by the joining of the outer panel 224 and inner panel 225 at an acute angle. Furthermore, while the exterior facing surface of inner panel 228 is substantially planar, the outer panel 224 has a convex or outwardly curved surface. In addition, the two panels are in a tapered, angled, or V-shape arrangement, such that there is an increase in width of the top and/or bottom panels in the direction from the front end 210 to the back end 212. For example, in FIG. 2, the distance or spacing between the outer panel 224 and inner panel 225 increases from a narrow first distance D1 to a longer second distance D2, then to a longer third distance D3 (approximately twice as great as L1), and a slightly longer fourth distance D4. Thus, the rear panel 226 is associated with the greatest width, and the horizontal surface area of the generally triangular bottom panel 250 and top panel (not visible in FIG. 2) increase in the rearward direction. For purposes of this application, V-shaped or tapered refers to a bending of a surface plane to produce an acute angle in its interior and an obtuse angle along the exterior. In addition, the V-shape need not be a sharp V shape (e.g., terminating in a pointed vertex, connecting two distinct portions), but can also encompass more rounded curvatures (similar to a U-shape), where the two portions form a substantially continuous surface, or include a radius within the bend of the forward tip portion.

As illustrated in FIG. 2, both the shape and size of each side skirt are configured to manipulate or reroute airflow in a targeted path that minimizes the effects of air drag along the sides of the underbody 202. Specifically, it may be observed that the tip end 222, providing an inlet for airflow along the first skirt 240, is disposed directly adjacent to a front inboard wall 230 of first wheel well 282, where the inboard wall refers to the side of the wheel well closest to a centerline of a vehicle, and an outboard wall refers to the side of the wheel well furthest from the centerline of the vehicle. Similarly, the rear panel 226 (corresponding to the outlet for airflow along the first skirt 240) extends from a first end 252 that is disposed directly adjacent to an outboard wall 232 of the second wheel well 284 to a second end 254 that is disposed directly adjacent to a rear inboard wall 238 of the second wheel well 284. As a result, as the vehicle moves forward, the front core underbody airflow is redirected and separated from the chaotic wheel wake associated with the front tires along the inner panel 228 of the skirt, while the rear core underbody airflow simply skims past the rear tires. In addition, the airflow along the outer panels of the vehicle is also redirected. More specifically, the front wheel wake is "scooped" by the side skirt and vented or exhausted out to the outer panels of the vehicle by the curvature of outer panel 224, and the remaining outer panel airflow is guided toward the back end of the skirt, primarily exiting out and parallel to the rear wheels and/or slightly "kicked away" or pushed out from the rear wheels. It may be appreciated that this rerouting of airflow along both the underbody and the sides of the vehicle, thereby decreasing or preventing the effects of wheel wake, can result in a significant percentage reduction in air drag, ranging from a 2-5% or more improvement, relative to the same vehicle without such a side skirt system.

Figure 3:
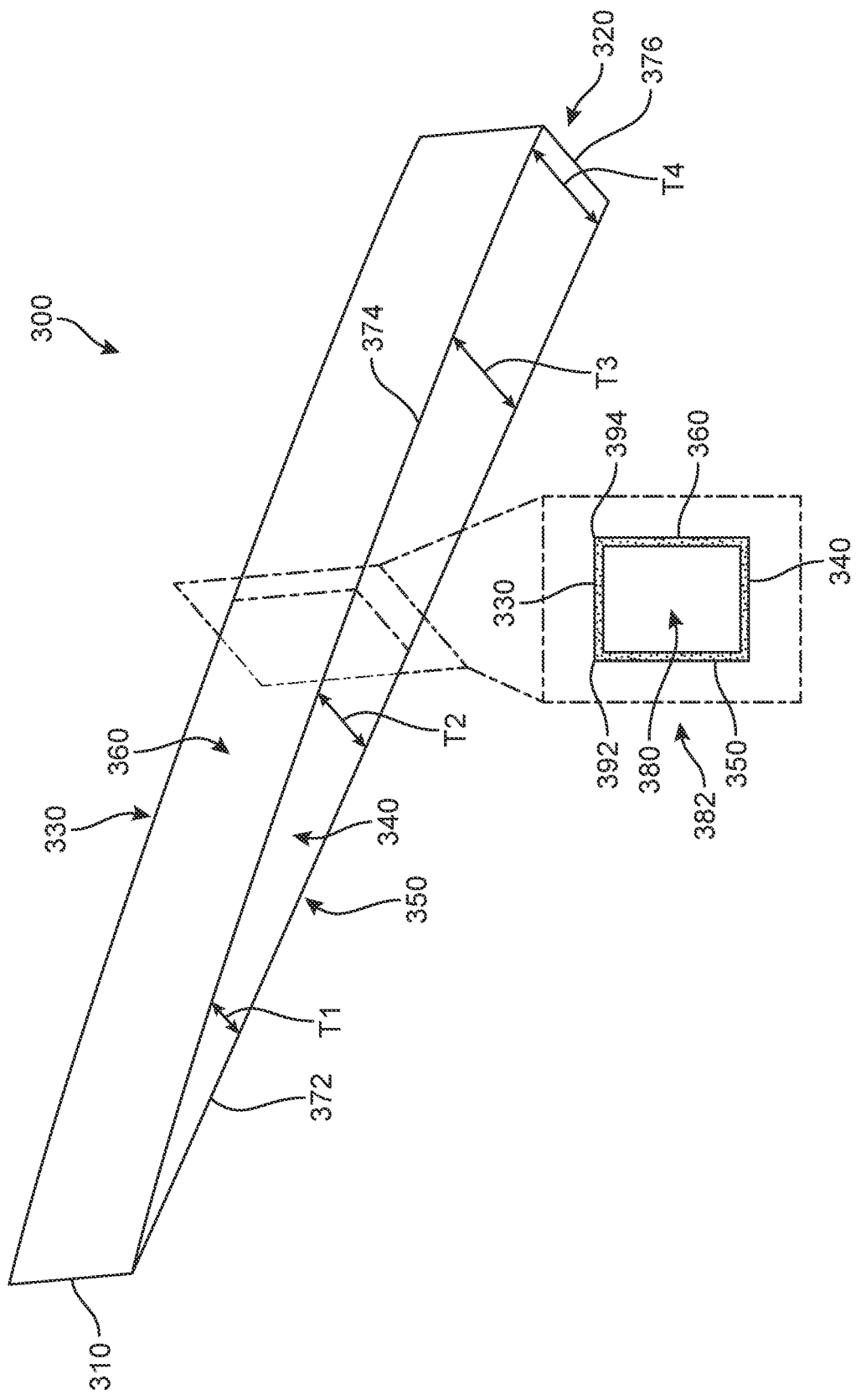
FIG. 3 is an isometric side view of a first type of side skirt apparatus that is substantially enclosed, according to an embodiment.

In different embodiments, the proposed side skirt apparatuses can include one or more modifications in structure that can accommodate desired variations in airflow path and vehicle type. Some of these embodiments will now be discussed with reference to FIGS. 3-6 below. In FIG. 3, an isometric view of a first aerodynamic apparatus ("first apparatus") 300 is illustrated. The first apparatus 300 is substantially similar to the side skirts previously presented in FIGS. 1A, 1B, and 2. Thus, the first apparatus 300 includes a three-dimensional wing-like or wedge outer shape in the horizontal plane, as discussed above, comprising a tapered end 310 and a rear panel 320, as well as a set of four bounded sides including a substantially flat or planar inner panel 350, a curved outer panel 360 (i.e., a curvature that bulges slightly outward, convex), a top panel 330, and a bottom panel 340. The bottom panel 340 extends between a first lower edge 372 of the inner panel 350 and a second lower edge 374 of the outer panel 360, such that the bottom panel 340 is in a substantially orthogonal orientation relative to the inner panel 350 and outer panel 360. Similarly, the top panel 330 extends between a first upper edge 392 of the inner panel 350 and a second lower edge 394 of the outer panel 360 (e.g., see cross-section 382) such that the top panel 330 is in a substantially orthogonal orientation relative to the inner panel 350 and outer panel 360.

In addition, the rear panel 320 extends along a third lower edge 376 of the bottom panel 340, and an upper edge of top panel 330, joining the two rear edges of the outer panel 360 and inner panel 350 together. The inner panel 350 and the outer panel 360 are joined together to provide a substantially V-shaped three-dimensional arrangement or configuration. In some embodiments, the structure is boxed, enclosing a substantially hollow interior space 380 (see cross-section 382, taken laterally along line A-A). In one embodiment, the first apparatus 300 has a substantially rectangular cross-sectional shape. In addition, as noted earlier, the curvature of outer panel 360 is such that the thickness of the apparatus increases from the front edge (tapered end 310) to the rear panel 320, for example from a relatively narrow first thickness T1, to a second intermediate thickness T2, a third thickness T3 slightly larger than T2, and a maximum fourth thickness T4 associated with the rear panel 320.

Figure 4:
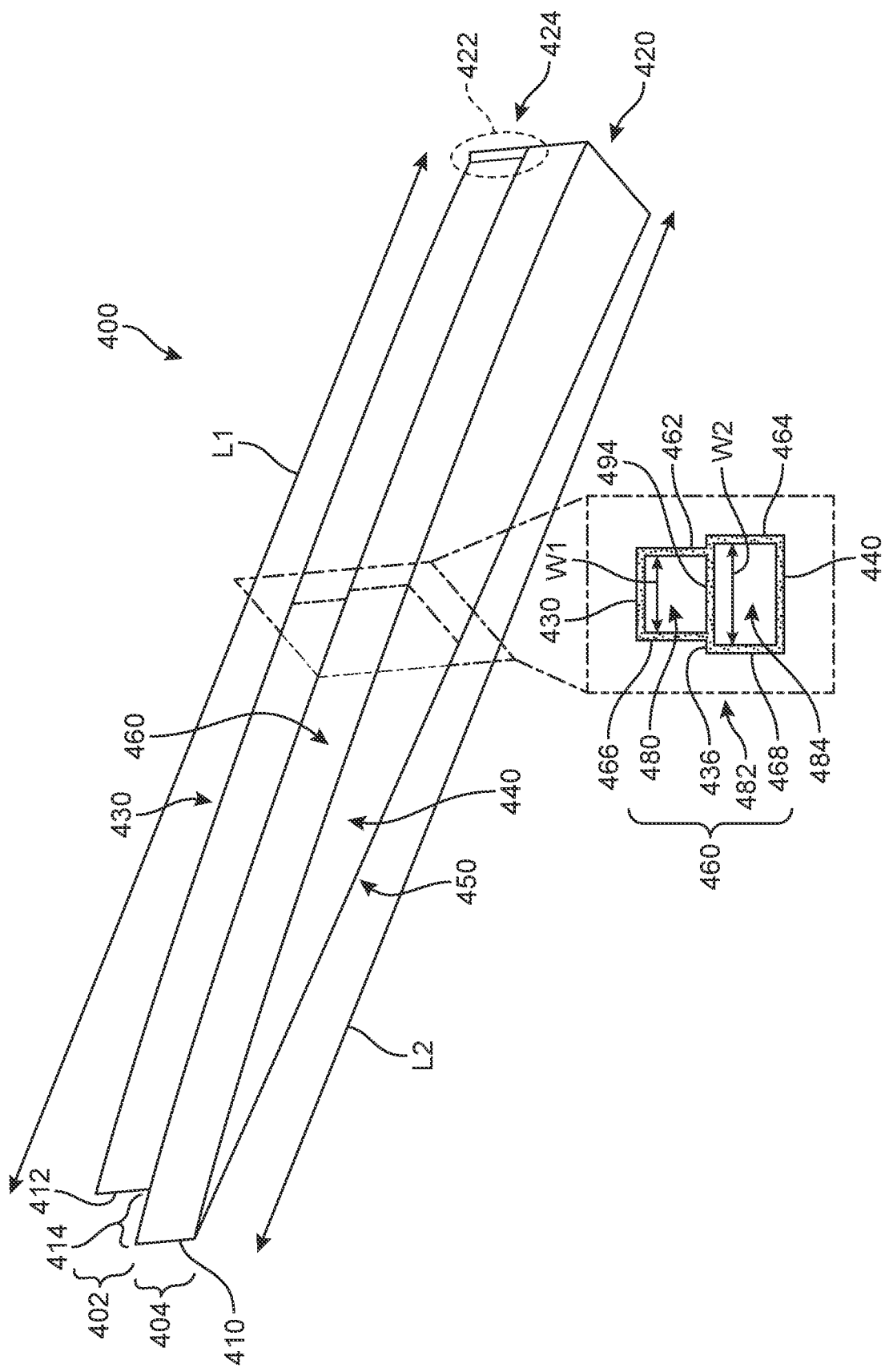
FIG. 4 is an isometric side view of a second type of side skirt apparatus that includes an upper portion and a lower portion, according to an embodiment.

Another embodiment is presented with respect to FIG. 4. In this example, a second aerodynamic apparatus ("second apparatus") 400 also includes an enclosed box structure with a generally wing-like or wedge outer shape in the horizontal plane. However, in this case, the second apparatus 400 includes two distinct levels or layers, including an upper layer 402 and a lower layer 404. In some embodiments, the two layers are stacked together, providing two separate hollow interior spaces or compartments (first compartment 480 and second compartment 484), as shown in cross-section 482, taken laterally along line B-B. In other embodiments, the interior may comprise a single, continuous space, with no division between the two compartments. In addition, in one embodiment, the second apparatus 400 has a substantially double-rectangular or stacked tier cross-sectional shape 460. In some cases, there can be two or more levels/layers that are arranged in a nested configuration (i.e., each layer having a smaller volume than the one directly below it, or each layer having a smaller volume than the one directly above it). In another embodiment, two or more layers that may or may not be directly adjacent can have different volumes relative to one another.

For purposes of reference, the upper layer 402 can be seen to comprise a first tapered end 412 and a first rear panel 424, as well as a set of four bounded sides including a first inner panel 462, a first outer panel 466, a top panel 430, and an upper-facing surface of a shared intermediate side 494. Similarly, the lower layer 404 includes a second tapered end 410 and a second rear panel 420, as well as a set of four bounded sides including a second inner panel 464, a second outer panel 468, a bottom panel 440, and the lower-facing surface of shared intermediate side 494.

In this example, the upper layer 402 has a first length L1 that is smaller than a second length L2 of the lower layer

404. In addition, as shown in cross-section 482, a first width W1 of upper layer 402 is also smaller than a second width W2 of lower layer. Thus, as upper layer 402 is stacked upon the lower layer 404, a surface area of the shared intermediate side 494 protrudes outward to form two exposed ledge portions (e.g., ledge portion 436) associated with the lower layer 404.

In addition, similar to the first apparatus 300 of FIG. 2, the curvature of the two outer panels of the second apparatus 400 is such that the thickness of the apparatus increases from the front (first tapered end 412 and second tapered end 410) to the rear (first rear panel 424 and second rear panel 420). However, while the two layers have similar shapes, the dimensions and volume of the first layer are smaller than that of the second layer. Furthermore, because the two distinct layers each have different relative widths, two distinct surfaces are formed along each side, creating two channels for directing airflow along the underbody and the sides of the vehicle. Such a configuration can offer a more targeted airflow guidance system, and disperse air flow along two (outer and inner) "tracks", thereby decreasing air drag.

One or more of the embodiments described herein can optionally include a 'rear kick' or flare portion 422 configured to further direct air flow outward and away from the vehicle. An example of this structural feature is illustrated in FIG. 4, but it should be understood that any of the disclosed implementations may incorporate the flare portion, and/or the second apparatus 400 may be provided without such a flare portion. For example, a flared tip portion 428 is illustrated in one of the side skirts of FIG. 2. In general, the flare portion 422 comprises a region extending outward from the surface of the outer panel along the edge adjacent to the rear panel. In this case, the flare portion 422 is an additional segment or tip extending at a slight curve from the upper layer 402. This type of structural feature provides a further routing mechanism for directing air away from the vehicle and reducing drag.

Figure 5:
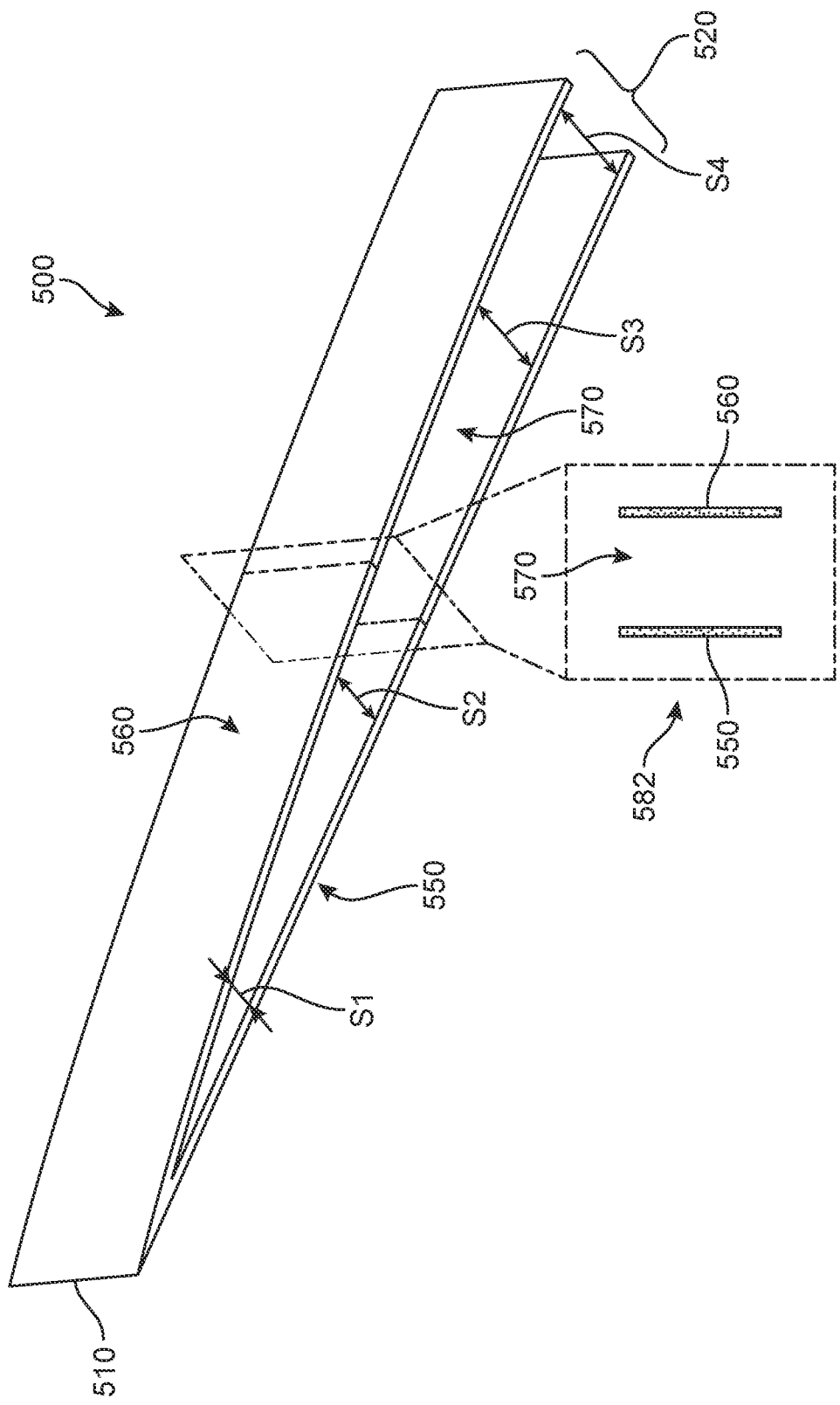
FIG. 5 is an isometric side view of a third type of side skirt apparatus that is partially exposed, according to an embodiment.

A third, more minimalistic embodiment is presented with respect to FIG. 5. In this example, a third aerodynamic apparatus ("third apparatus") 500 also includes a generally wing-like or wedge outer shape in the horizontal plane. However, in this case, the structure is no longer fully enclosed. Instead, the top panel, bottom panel, and rear panel have been removed, leaving a substantially open V-shaped structure comprising only an inner panel 550 and an outer panel 560 joined at an edge region 510. Thus, rather than enclosing an interior space, a channel 570 is formed, which can be more clearly visible in cross-section 582, taken laterally along C-C. In addition, the width of the channel increases along the length of the structure in accord to the curvature of outer panel 560. This can be seen by an increase in spacing between outer panel 560 and inner panel 550 in the direction extending rearward from edge region 510, for example from a relatively narrow first spacing S1, to a second intermediate spacing S2, a third spacing S3 slightly larger than S2, and a maximum fourth spacing S4 associated with a rear opening 520. Thus, as airflow moves along the external facing surfaces of outer panel 560 and inner panel 550, air can also be received and guided through the channel 570. This type of embodiment can provide a more lightweight structure, and can in some embodiments, allow for the sides of the structure to be folded closer together (collapsed) when stowed (such that the spacing between the sides is decreased), facilitating storage of the structure in a smaller space within the vehicle, and extended open again when deployed.

Figure 6:
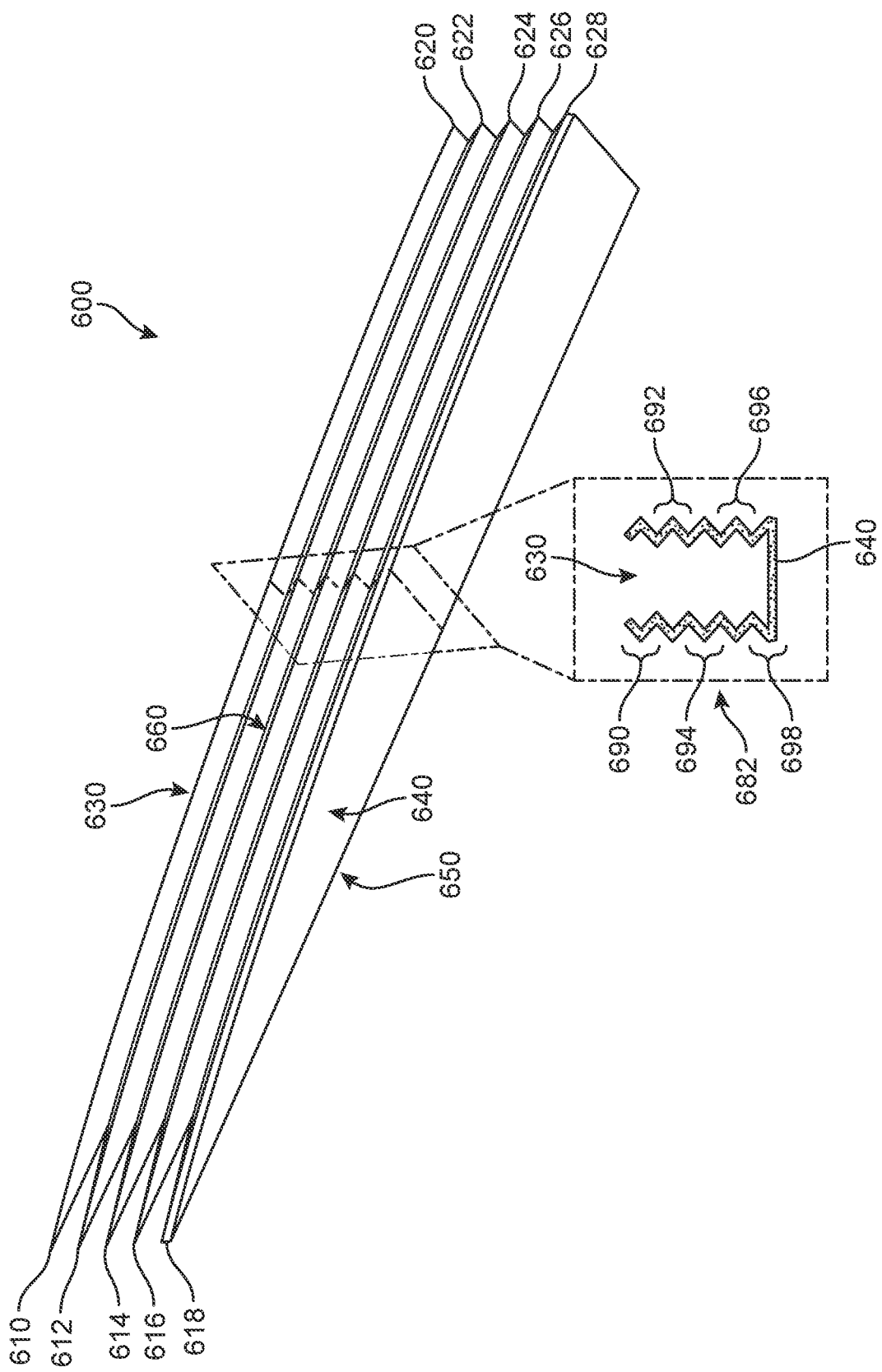
FIG. 6 is an isometric side view of a fourth type of side skirt apparatus that includes multiple tapered portions, according to an embodiment.

A fourth embodiment is presented with respect to FIG. 6 in which multiple airflow channels or tracks are formed. In this example, a fourth aerodynamic apparatus ("fourth apparatus") 600 includes the generally wing-like or wedge outer shape in the horizontal plane. However, in this case the apparatus further comprises a plurality of levels or segments stacked one atop the other in the vertical direction. For example, in FIG. 6, the fourth apparatus 600 includes a series of five stacked or telescoping segments, more clearly observable in cross-section 682, comprising a first (uppermost) segment 690, a second segment 692, a third segment 694, a fourth segment 696, and a fifth (bottommost) segment 698. Each segment extends longitudinally from a tip portion to a rear portion. For example, first segment 690 extends between a first tip 610 to a first rear portion 620, the second segment 692 extends between a second tip 612 to a second rear portion 622, the third segment 694 extends between a third tip 614 to a third rear portion 624, the fourth segment 696 extends between a fourth tip 616 to a fourth rear portion 626, and the fifth segment 698 extends between a fifth tip 618 to a fifth rear portion 628.

In contrast to the stacked arrangement of FIG. 4, the segments in fourth apparatus 600 are merged together to form a substantially continuous interior chamber 630, as shown in cross-section 682 taken laterally along line D-D. The chamber 630 is bounded on each side by two zig-zagging surfaces comprising an outer panel 660 and inner panel 650, and along the bottom by a bottom panel 640, while remaining open or exposed along a top region. In one embodiment, the cross-section can include an open accordion-bellows type outer shape. In other embodiments, the segments may be discrete compartments that are stacked together while providing separate internal spaces (e.g., see FIG. 4). Furthermore, in different embodiments, each segment is disposed such that the structure as a whole is evenly aligned. For example, in FIG. 6, each tip (610, 612, 614, 616, 618) is substantially aligned along a vertical axis, and the rear portions (620, 622, 624, 626, 628) are similarly aligned. In addition, in some embodiments, two or more of the segments are substantially similar in shape and dimensions. For example, in FIG. 6, at least second segment 692, third segment 694, fourth segment 696, and optionally first segment 690 can be understood to include approximately the same size and shape relative to one another. The base (fifth segment 698), represents a half 'sliced' portion of the other segments, thereby providing a substantially flat bottommost surface for minimizing the obstacles to air flow beneath the vehicle, similar to the apparatuses illustrated in FIGS. 3 and 4. However, in other embodiments, this telescoping configuration can be comprised of segments that differ in size (similar to FIG. 4), such that there is a decrease in the volume associated with each segment when moving from the bottom segment to the top segment, or when moving from the top segment to the bottom segment. In other embodiments, two or more segments may have different volumes relative to one another.

In different embodiments, because the segments each have a vertex extending outward toward the two sides (inner panel and outer panel) producing the bellows-shape, multiple channels for directing airflow along the underbody and the sides of the vehicle are made available. Such a configuration can offer a more targeted airflow guidance system, and disperse air flow along four outer and four inner symmetrical "tracks", thereby decreasing air drag. In addition, in some embodiments, the apparatus is configured to expand or extend in the vertical direction for deployment and/or collapse or flatten for retraction into its storage chamber. In other words, the bellows configuration can enable the structure to flatten or compress inward to allow for a more compact storage arrangement.

Figure 7A:
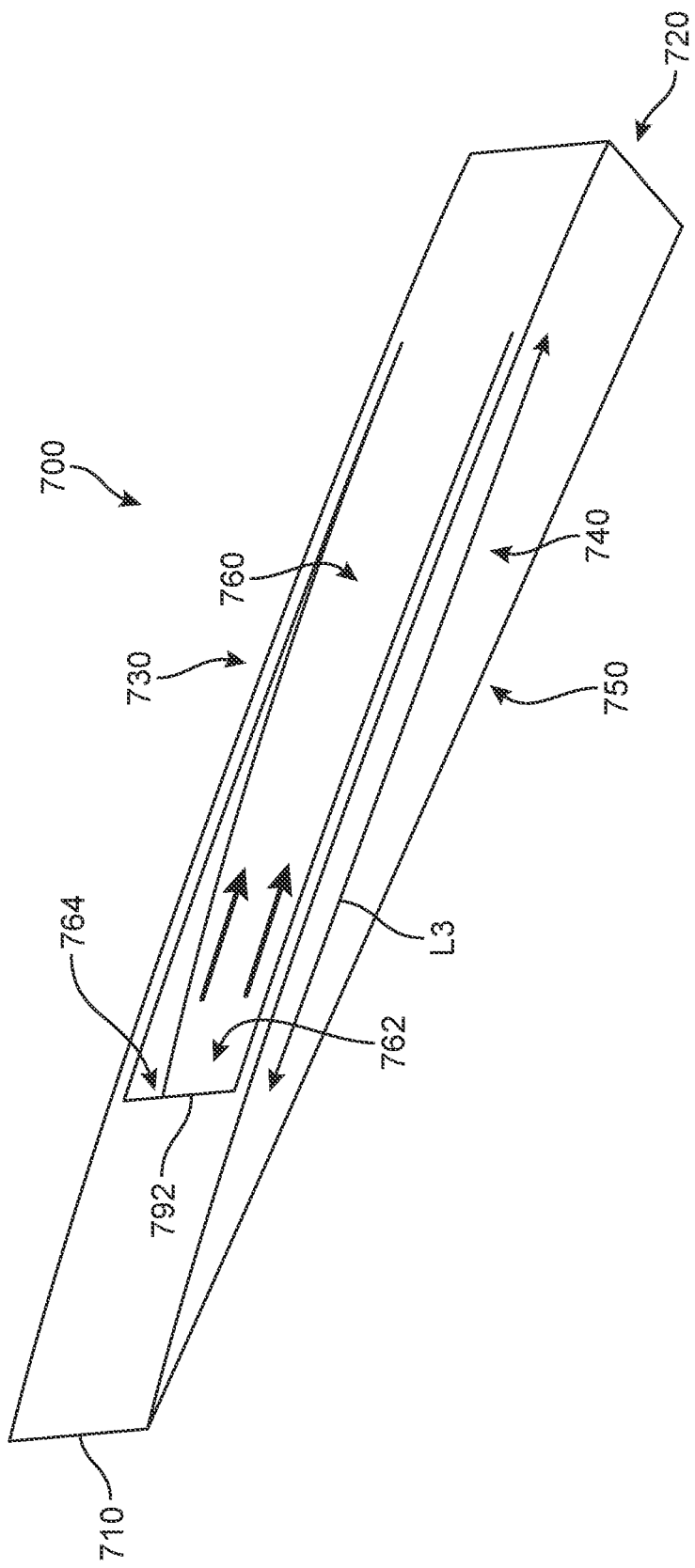
FIGS. 7A and 7B are isometric side views of a fifth type of side skirt apparatus that include a vented region, according to an embodiment.
Figure 7B:
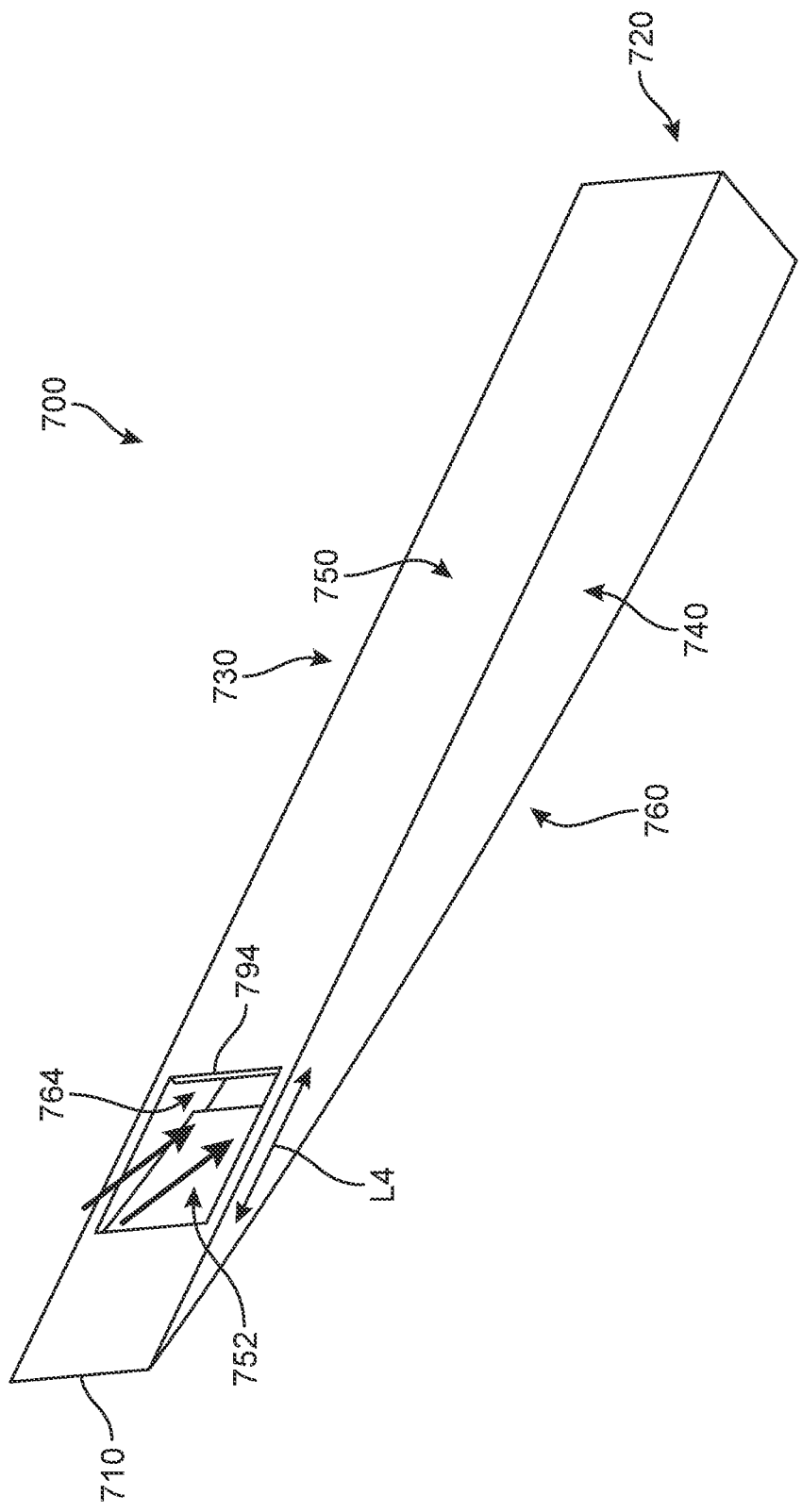
Figure 8:
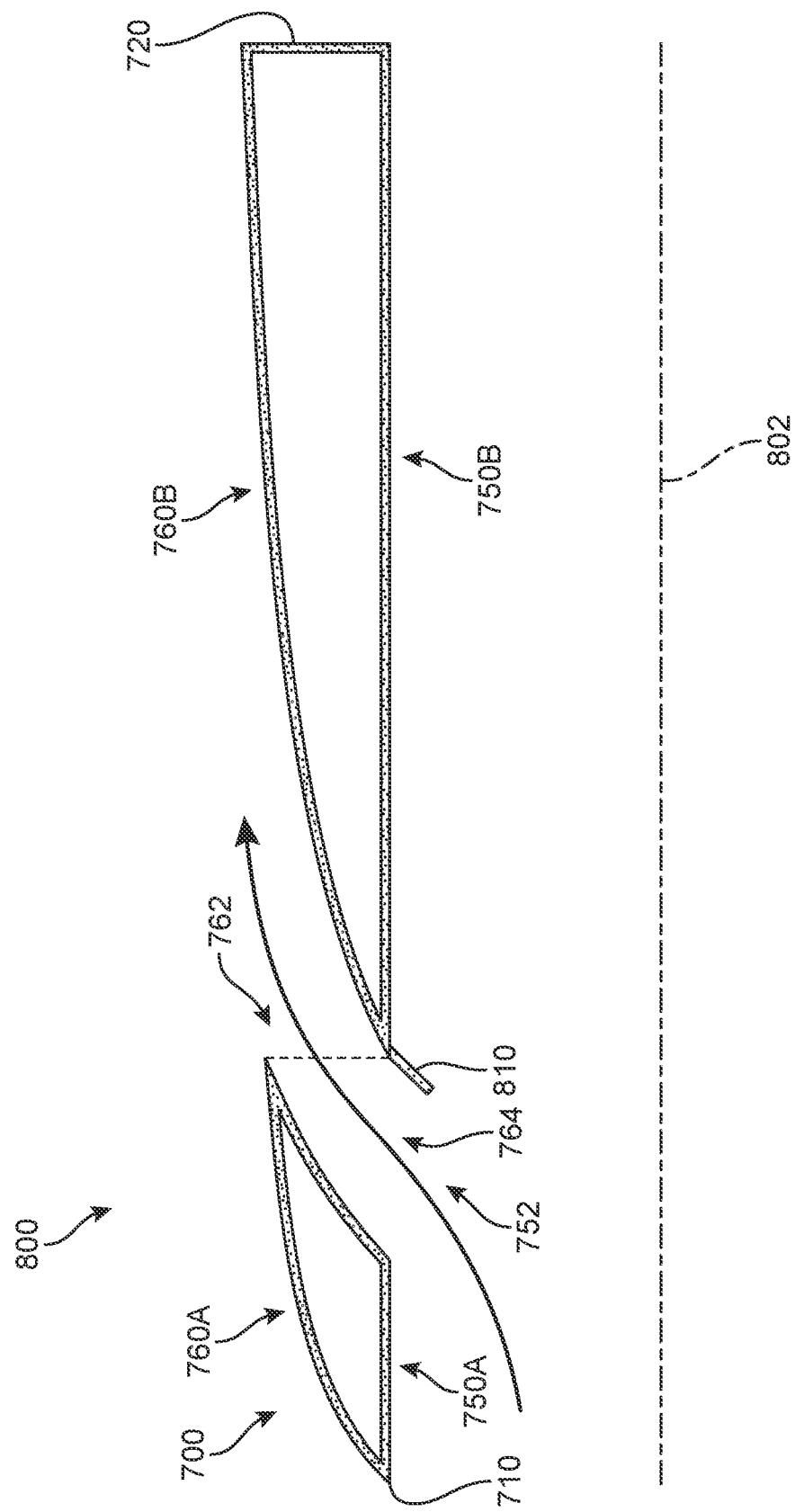
FIG. 8 is a schematic cross-section of the side skirt apparatus of FIGS. 7A and 7B, according to an embodiment.

Two additional embodiments offering an alternative mechanism by which airflow may be manipulated are now discussed with reference to FIGS. 7A-10. In a general sense, these two embodiments are substantially similar to the apparatus of FIG. 3. However, in contrast to the solid, substantially continuous outer surface of first apparatus 300, the following two embodiments comprise open channels extending between the inner panel and the outer panel. In FIGS. 7A, 7B, and 8, an example of a first vented aerodynamic apparatus ("first vented apparatus") 700 that includes a first airflow passage ("first passage") between an inner panel 750 and an outer panel 760 is presented, shown relative to a vehicle underbody centerline 802. As shown in the two isometric views of FIGS. 7A and 7B, a through-hole 764 allows for fluid communication between an inlet 752 formed on the inner panel 750 and an outlet 762 formed on the outer panel 760. In other respects, the first vented apparatus 700 includes an overall structure similar to that of first apparatus 300 (see FIG. 3), including a tapered end 710 toward the front, a rear panel 720, as well as a set of four bounded sides including a substantially planar inner panel 750, a curved outer panel 760, a top panel 730, and a bottom panel 740.

In different embodiments, each of the inlet 752 and outlet 762 comprise recessed regions extending into an interior of the apparatus structure. More specifically, as shown in FIG. 7B, the inlet 752, disposed near the tapered end 710 of the apparatus, includes a first opening formed in the outermost surface of the inner panel 750. The first opening includes a ramped or sloped portion on one end that increases in depth as it moves toward the center and approaches the through-hole 764, ending at a first edge 792 on the opposing side (visible in FIG. 7A). Similarly, the outlet 762, disposed further from the tapered end 710, includes a second opening formed in the outermost surface of the outer panel 760. This second opening includes a ramped or sloped portion on one end that increases in depth as it moves toward the tapered end 710 and approaches the through-hole 764, ending at a second edge 794 on the opposing side (visible in FIG. 7B). In this example, the opening on each side is substantially rectangular, though in other embodiments an opening can comprise different regular or irregular shapes.

In addition, in this embodiment, a third length L3 of the outlet 762 is larger than a fourth length L4 of the inlet 752. This difference in length provides a greater sloping (steeper) surface along the inlet 752 than the surface of the outlet 762. Such a structural arrangement increases airflow into the inlet 752 which then exits outlet 762 and is passed out along the external sides of the vehicle body, thereby reducing the drag force on the vehicle.

For purposes of clarity, a simplified longitudinal cross-section 800 of the first vented apparatus 700, taken along a horizontal plane, is illustrated in FIG. 8. The cross-section 800 more clearly depicts the passage formed through the apparatus comprising the inlet 752 on the inner panel (labeled as first inner segment 750a and second inner segment 750b) and the outlet 762 on the opposing outer panel (labeled as first outer segment 760a and second outer segment 760b), connected via through-hole 764.

In addition, in some embodiments, a scoop portion 810 configured to facilitate the flow of air into the inlet 752 may be included, for example extending out from an edge of the second inner segment 750b. The scoop portion 810 may comprise a substantially smooth surface that serves as an extension of the rearward wall of the inlet. In one embodiment, the scoop portion 810 can extend or protrude inward from a rear vertex of the inlet at an angle, generally toward a centerline of the underbody of the vehicle. Such scoop structures can also be employed by the inlets formed in the embodiment of FIGS. 9A-10 below. The scoop portion enables the apparatus to capture and reroute more air through the passage, further decreasing the pressure exerted by drag on the vehicle.

Figure 9A:
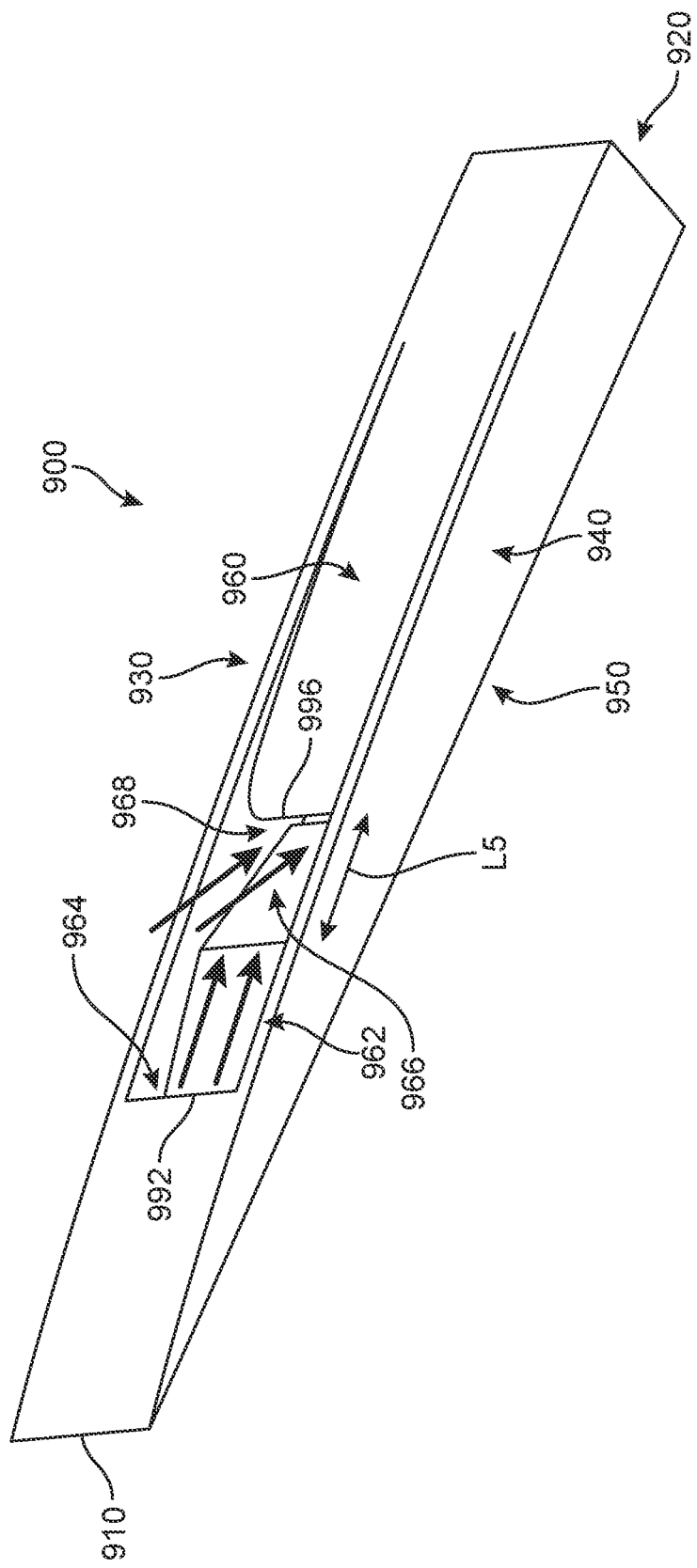
FIGS. 9A and 9B are isometric side views of a fifth type of side skirt apparatus that include two vented regions, according to an embodiment.
Figure 9B:
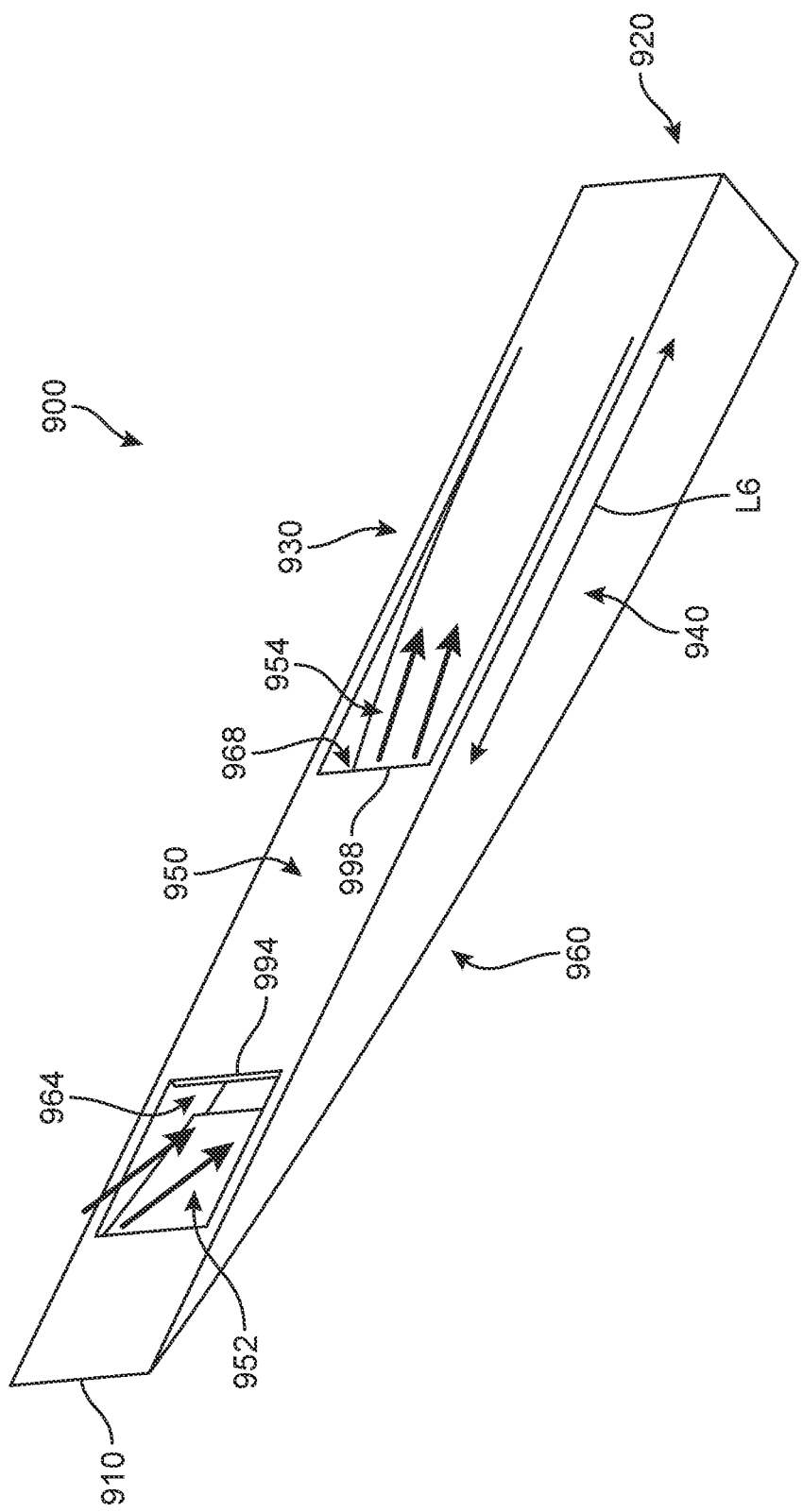
Figure 10:
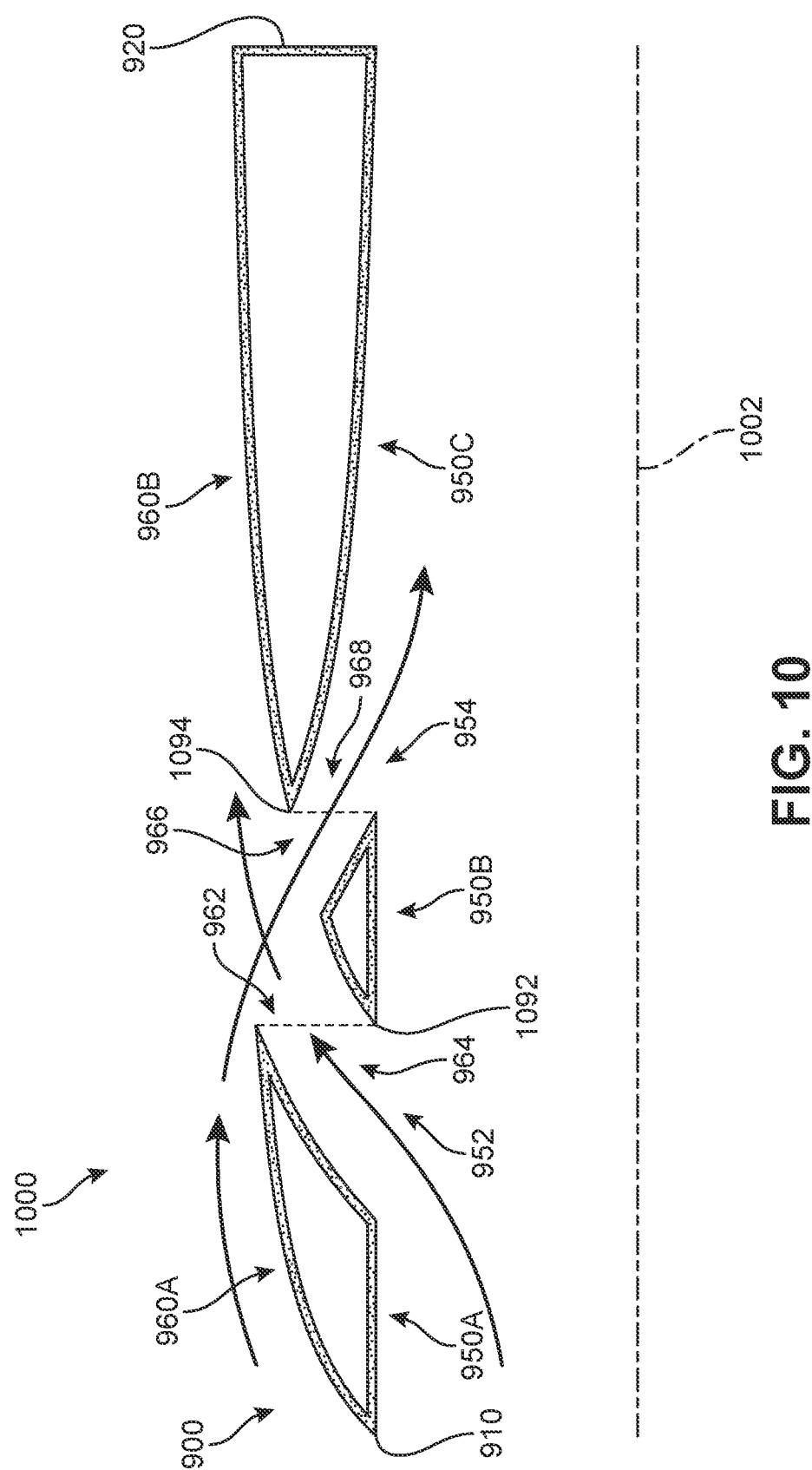
FIG. 10 is a schematic cross-section of the side skirt apparatus of FIGS. 9A and 9B, according to an embodiment.

In FIGS. 9A, 9B, and 10, an example of a second vented aerodynamic apparatus ("second vented apparatus") 900 that includes two airflow passages extending between an inner panel 950 and an outer panel 960 is presented. As shown in the two isometric views of FIGS. 9A and 9B, a first through-hole 964 allows for fluid communication between a first inlet 952 formed on the inner panel 950 and a first outlet 962 formed on the outer panel 960 (similar to the embodiment of FIGS. 7A and 7B), referred to herein as a first channel. In addition, a second through-hole 968 allows for fluid communication between a second inlet 966 formed on the outer panel 960 and a second outlet 954 formed on the inner panel 950, referred to herein as a second channel. In other respects, the second vented apparatus 900 includes an overall structure similar to that of first apparatus 300 (see FIG. 3), including a tapered end 910 toward the front, a rear panel 920, as well as a set of four bounded sides including the substantially planar inner panel 950, the curved outer panel 960, a top panel 930, and a bottom panel 940.

In different embodiments, each of the inlets and outlets comprise recessed regions extending into an interior of the apparatus structure. More specifically, as shown in FIG. 9B, the first inlet 952, disposed near the tapered end 910 of the apparatus, includes a first opening formed in the outermost surface of the inner panel 950. The first opening includes a ramped or sloped portion on one end that increases in depth as it moves toward the center and approaches the through-hole 964, ending at a first edge 992 on the opposing side (visible in FIG. 9A). Similarly, the first outlet 962, disposed further from the tapered end 710, includes a first opening formed in the outermost surface of the outer panel 960. This second opening includes a ramped or sloped portion on one end that increases in depth as it moves forward toward the tapered end 910 and approaches the through-hole 964, ending at a second edge 994 on the opposing side (visible in FIG. 9B). In this example, the opening on each side is substantially rectangular, though in other embodiments an opening can comprise different regular or irregular shapes.

It can further be observed that in this embodiment, similar to the embodiment of FIGS. 7A and 7B, a first length of the first outlet 962 is substantially longer than a second length of the first inlet 952. In other words, the slope of the first inlet 952 is greater than the more gradual slope of the first outlet 962. Such an arrangement facilitates the rapid movement of air along the underbody into the first inlet 952 to be smoothly dispersed by the first outlet 962 along the external sides of the vehicle, greatly decreasing the effects of air drag on the vehicle.

In addition to this first passageway, the second vented apparatus 900 also includes another passageway disposed further from the tapered end 910. More specifically, as shown in FIG. 9A, the second inlet 966, disposed directly adjacent to the first outlet 962, includes a second opening formed in the outermost surface of the outer panel 960. The second opening also includes a ramped or sloped portion on one end that increases in depth as it moves toward the center and approaches the second through-hole 968, ending at a third edge 998 on the opposing side (visible in FIG. 9B).

Similarly, the second outlet 954, disposed further rearward and spaced apart from the first inlet 952, includes a second opening formed in the outermost surface of the inner panel 950. This second opening includes a ramped or sloped portion on one end that increases in depth as it moves forward toward the tapered end 910 and approaches the second through-hole 968, ending at a fourth edge 996 on the opposing side (visible in FIG. 9A). In this example, the recessed opening on each side is substantially rectangular, though in other embodiments an opening can comprise different regular or irregular shapes.

It can further be observed that in this embodiment, similar to the embodiment of FIGS. 7A and 7B, a first length of the first outlet 962 is substantially longer than a second length of the first inlet 952. In other words, the slope of the first inlet 952 is greater than the more gradual slope of the first outlet 962. Such an arrangement facilitates the rapid movement of air along the underbody into the first inlet 952 to be smoothly dispersed by the first outlet 962 along the external sides of the vehicle, reducing drag force on the vehicle.

Similarly, a fifth length L5 of the second outlet 954 is substantially longer than a sixth length L6 of the second inlet 966. In other words, the slope of the second inlet 966 is greater than the more gradual slope of the second outlet 954. Such an arrangement facilitates the rapid movement of air along the sides of the vehicle into the second inlet 966 to be smoothly dispersed by the second outlet 954 along the underbody of the vehicle, greatly decreasing the effects of air drag on the vehicle.

For purposes of clarity, a simplified longitudinal cross-section 1000 of the second vented apparatus 900, taken along a horizontal plane, is illustrated in FIG. 10, shown relative to a vehicle underbody centerline 1002. The cross-section 1000 more clearly depicts the passages formed through the apparatus comprising the first inlet 952 and second outlet 954 on the inner panel (labeled as first inner segment 950a, second inner segment 950b, and third inner segment 950c) and the first outlet 962 and second inlet 966 on the opposing outer panel (labeled as first outer segment 960a and second outer segment 960b). The first inlet 952 and first outlet 962 are connected via first through-hole 964, forming the first channel, and the second inlet 966 and second outlet 954 are connected via second through-hole 968, forming the second channel.

As depicted by arrows, in this arrangement, some of the airflow passing through the forward end of the underbody (along first inner segment 950a) can travel through the first channel can be dispersed out along the side of the vehicle, as well as partially around and into the second channel, being routed out along third inner segment 950c, allowing for a more rapid flow of air along the vehicle. Similarly, some of the airflow passing along the first outer segment 960a of the vehicle can be routed through the second channel, continuing rearward along the second outer segment 960b. In addition, in different embodiments, as noted above with respect to FIG. 8, a scoop portion configured to facilitate the flow of air into the first inlet 952 may be included, for example extending outward from an edge of the second inner segment 950b (e.g., first vertex 1092). Additionally or alternatively, a scoop portion may be included that extends outward from an edge of the second outer segment 960b (e.g., second vertex 1094).

It should be understood that, in different embodiments, the system and method can use sensed information from vehicle sensors or sensors from a mobile device (such as a smartphone) that is in the vehicle to detect the requisite increase in speed and/or merging onto a highway environment—also referred to herein as a triggering event—indicating the side skirt should be deployed. By automatically deploying the aerodynamic structures in response to a particular velocity, the system and method can help reduce the degree of air drag on the vehicle.

As one example, in some embodiments, the vehicle may include a speed monitoring and skirt deployment system. The system may include multiple automotive components that may communicate via electronic control units. The components may include individual apparatuses, systems, subsystems, mechanisms and the like that may be included in the vehicle. In different embodiments, the vehicle may include sensors that may detect changes in the environment or detect events to determine whether the vehicle has exceeded a speed threshold for at least a first duration, and/or whether the vehicle has fallen below a speed threshold for at least a second duration. In another example, the vehicle can include sensors that detect when the vehicle is on a designated highway or other high-speed roadway, or an absence or presence of obstacles such as speed bumps (e.g., obstacles that might interfere with or affect the deployment of the side skirts). A number of different sensors may be used that include a wide variety of technologies, including but not limited to infrared sensors, ultrasonic sensors, microwave sensors, audio sensors, proximity sensors, accelerometers, odometer data, pressure sensors, light sensors, magnetometers, gyroscopes, passive acoustic sensors, laser detectors, GPS navigation sensors, or the like that may be used to detect the speed and/or environmental context of the vehicle.

Figure 11:
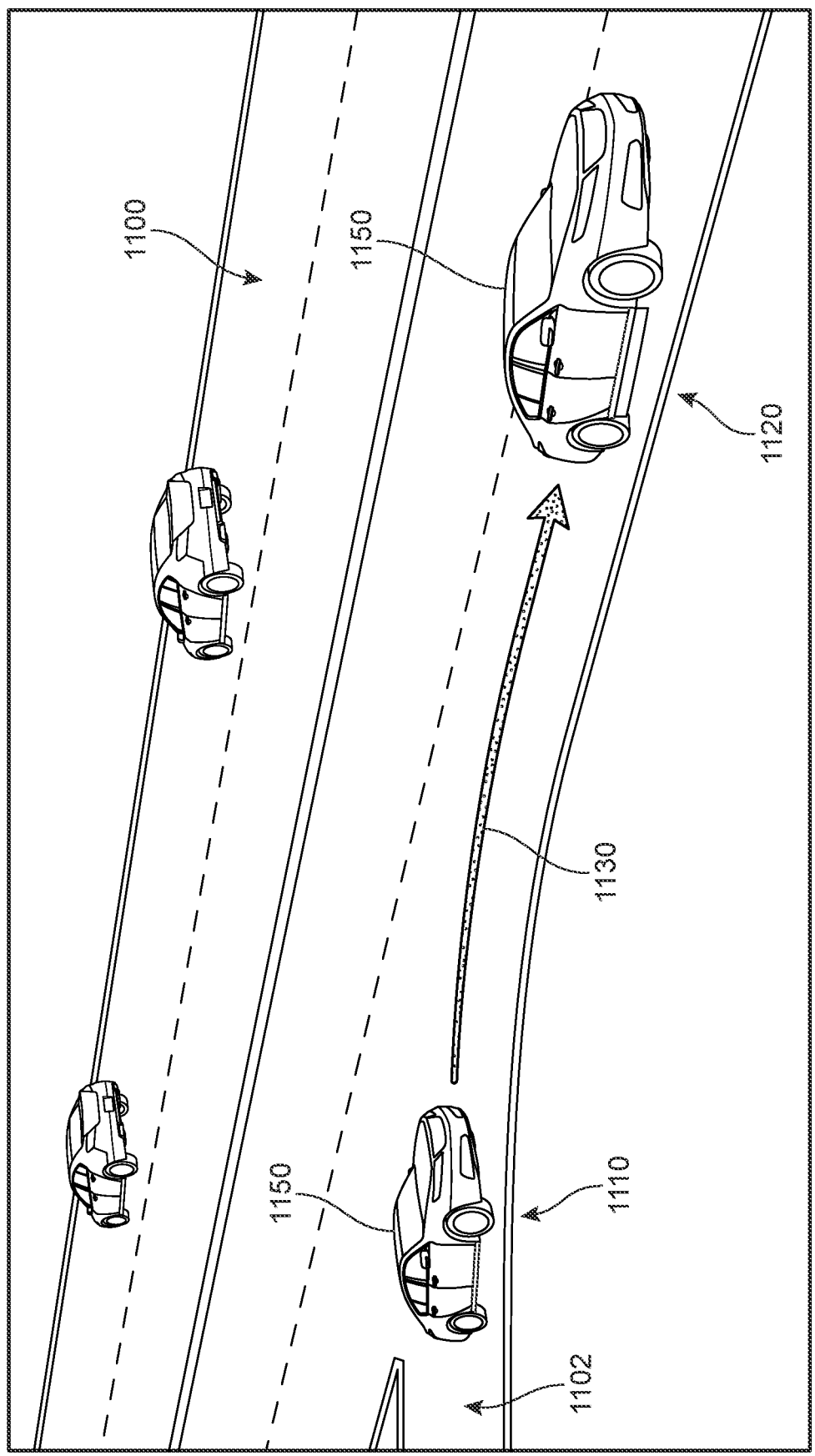
FIG. 11 is an example of a vehicle merging onto a highway and increasing speed, according to an embodiment.

As noted earlier, the proposed aerodynamic apparatuses can be configured to deploy and retract as desired in order to accommodate the various operating conditions of a vehicle. One non-limiting example of this sequence is illustrated in FIGS. 11-12C. In FIG. 11, a car 1150 is shown as it merges onto a highway 1100. In this case, the car 1150 begins its transition onto the high-speed highway 1100 via an onramp 1102 at a first position 1110. In order to safely merge into the faster moving traffic, car speeds up (represented by arrow 1130) and enters the highway 1100 at a higher speed by the time it reaches a second position 1120.

In different embodiments, in response to an increase in speed above a particular threshold (established by the manufacturer and/or selected by the driver), the car 1150 is configured to automatically deploy its aerodynamic side skirts. Similarly, in some embodiments, in response to a decrease in speed below a particular threshold (established by the manufacturer and/or selected by the driver), or the presence of stop-and-go conditions, the car 1150 is configured to automatically retract its aerodynamic side skirts. Thus, as shown in FIG. 11, while the car 1150 is in first position 1110, the side skirts are still stowed, but by the time the car has sped into second position 1120, the side skirts have extended out and downward, thereby providing the range of aerodynamic benefits described herein. When the car 1150 slows down (e.g., to leave the highway 1100), the side skirts will be automatically retracted and stowed again. In other embodiments, the deployment and/or retraction may be triggered manually by the driver as desired by a control interface in the vehicle.

Figure 12A:
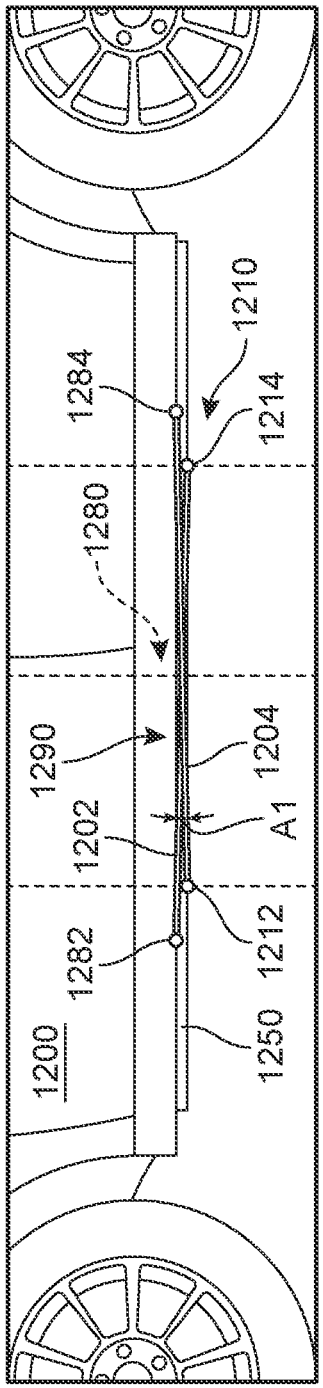
FIGS. 12A-12C present a sequence in which a side skirt apparatus transitions from a stowed mode to a deployed mode, according to an embodiment.
Figure 12B:
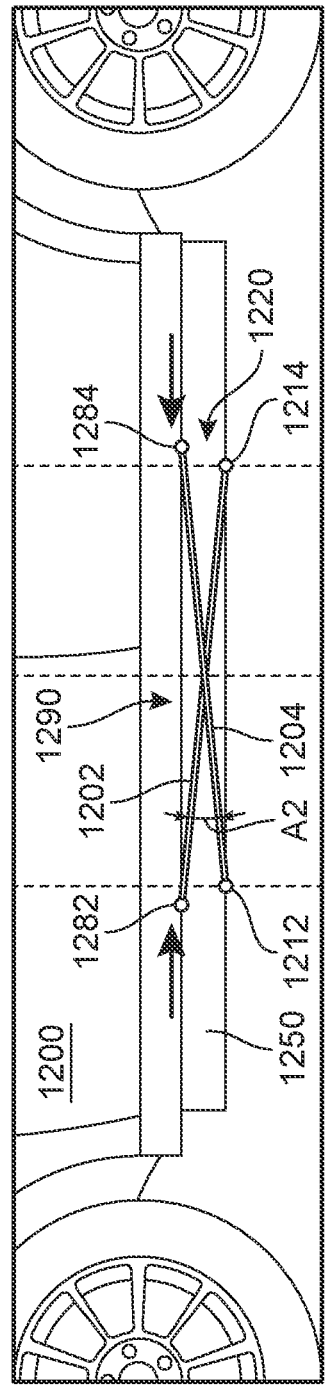
Figure 12C:
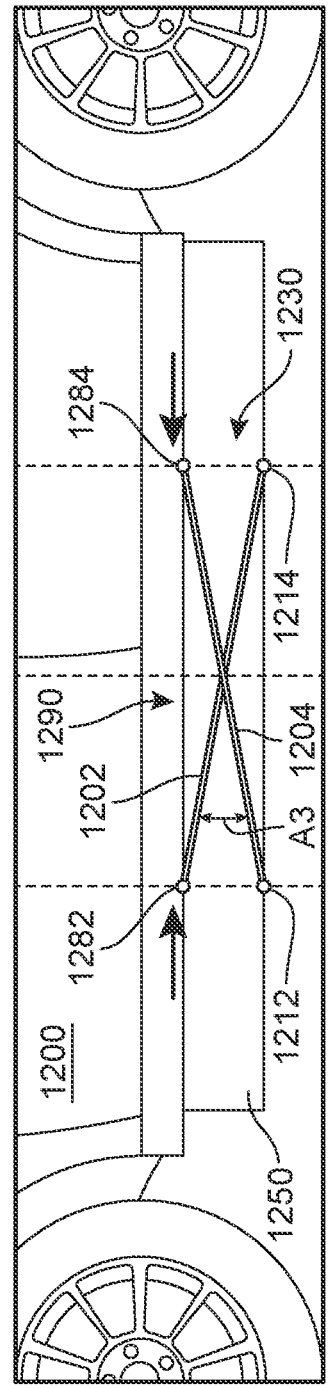

An example of the deployment process is depicted with reference to FIGS. 12A-12C. In FIGS. 12A-12C, a side-view of vehicle 1200 is shown. In FIG. 12A, an aerodynamic system 1250 is in its stowed configuration, such that a mechanism 1290 comprising a pair of crisscrossed arms is collapsed in an initial position 1210. The mechanism is not intended to be limiting, and can differ in other embodiments. In this case, it can be understood that the lower ends of the arms (1212, 1214) are joined to a bottom edge of the side skirt. Upper ends of arms (1282, 1284) are configured to slide back and forth on a rail 1280 mounted on the body of the vehicle above, for example within the skirt stowage chamber formed in the vehicle sidewall. In the first position, a first arm 1202 and a second arm 1204 connected at a central point are nearly parallel to or aligned with one another (relative to a horizontal plane), where a first angle A1 is near zero. At this time, the side skirt is stored within a chamber formed in a sidewall of the vehicle (for example, within the front door) that is sized and dimensioned to stow the entirety of or a substantial entirety of apparatus when it is not in use.

Once a triggering signal is received by the system, the mechanism 1290 will respond by initiating deployment, as seen in FIGS. 12B and 12C. In FIG. 12B, the outer ends of the two arms (1212, 1214, 1282, 1284) are shown moving along a horizontal axis (i.e., being pulled inward, such that a distance between the two upper ends 1282 and 1284 decreases, and a distance between the two lower ends 1212 and 1214 decreases). In other words, there is a compression of the arms toward a center of the vehicle 1200, such that first angle A1 widens to a second angle A2. This causes the two ends of the arms (1212, 1214) to move lower, moving the side skirt downward to a second intermediate position 1220.

Finally, in FIG. 12C, the first arm 1202 and the second arm 1204 have been further compressed, again widening the angle from second angle A2 to a larger third angle A3. This results in the outer ends of the two arms (1212, 1214, 1282, 1284) to move further inward relative to a horizontal axis (i.e., being pulled inward, such that a distance between the two upper ends 1282 and 1284 further decreases, and a distance between the two lower ends 1212 and 1214 further decreases). This causes the two ends of the arms (1212, 1214) to move lower, thereby moving the side skirt into its fully deployed or extended position 1230. It can be appreciated that the retraction process can correspond to a reversal of the deployment process illustrated herein.

It should also be understood that each skirt apparatus is sufficiently rigidly mounted to the interior of its chamber (e.g., along the rail) such that the skirt is generally prevented from tilting under normal wind and road air forces when deployed. In addition, in different embodiments, the skirt apparatus can comprise a composite material, including but not limited to a plastic core and metal outer skins coupled to the plastic core, or other suitable composite materials or non-composite materials such as metals, metal alloys, and/or plastics, for example.

As noted earlier, deployment and/or retraction can be initiated manually and/or automatically. In the case of a manual trigger, a user may select an option for a manual trigger via an interface provided via a user device connected to the vehicle or through a vehicle user interface. Thus, communications may optionally be established between a vehicle computing system and a user device. In the case of an automated initiation, the triggering event will correspond to one or more sensor data received via vehicle sensors indicating a condition matching a parameter for the deployment or retraction of one or both side skirts. In one embodiment the vehicle has an onboard diagnostic (OBD) system included in or connected to the vehicle computing system that is configured to continuously monitor various aspects of a vehicle such as the powertrain, emissions, chassis, and body of the vehicle, as well as other vehicle aspects. The OBD can be monitoring various automotive sensors built within the vehicle. In the automotive industry there is an industry wide standard for OBD computers, and what the OBD system monitors, known as OBD-II. These standard sensors provide data relating to various vehicle systems including the engine, transmission, chassis, and other vehicle systems. In one embodiment the activation sensor(s) are sensors already incorporated in the OBD. In another embodiment one or more of the sensors are separate from the OBD.

Those skilled in the art will appreciate that other triggers and sensors may be used in the system. Such sensor devices may be used to determine the vehicle's attitude, position, heading, velocity, location, acceleration, operation history, and the like. Sensor systems may also be used to sense objects around the vehicle, such as other vehicles, pedestrians, bicyclists, buildings, traffic signs, traffic lights, intersections, bridges, and the like. The system may be triggered by one of the vehicles safety systems being deployed such as the auto door lock being engaged or disengaged, or the parking of the vehicle. Those skilled in the art will appreciate that a multitude of other sensors and triggers could be used and the embodiments are not limited to the listed sensors.

Figure 13:
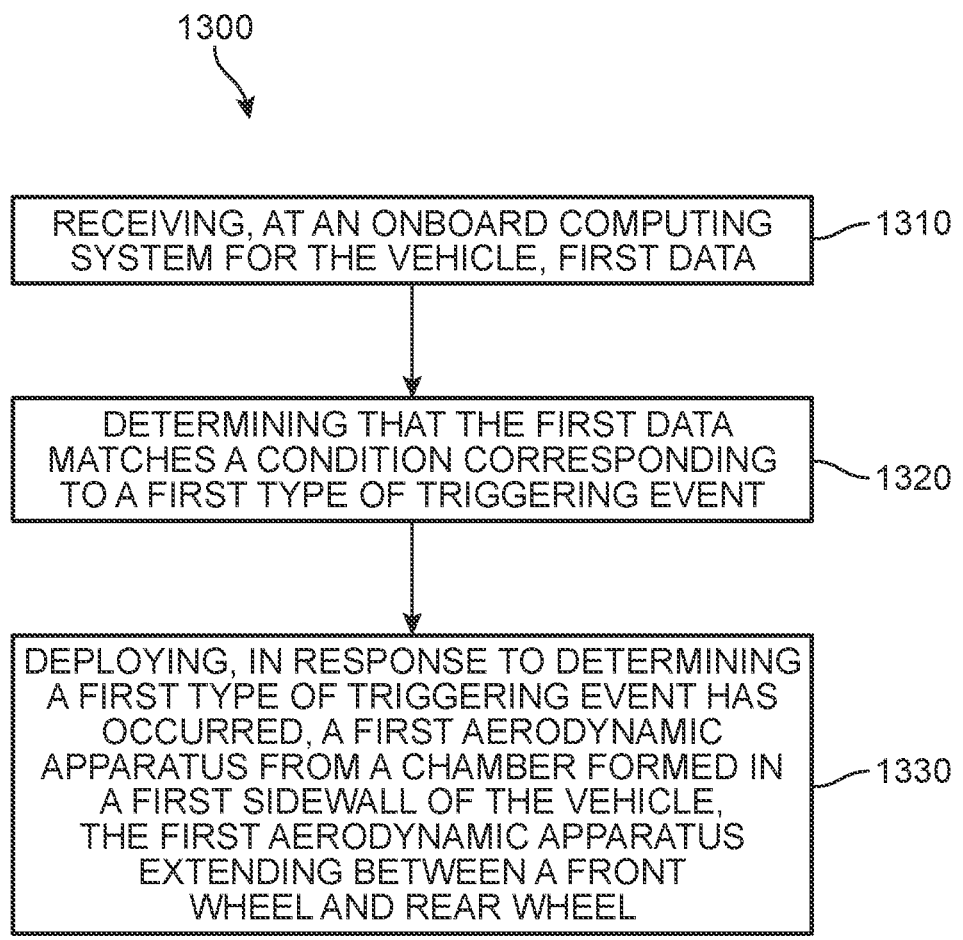
FIG. 13 is a flow diagram of a process for deploying a side skirt apparatus in response to a change in a vehicle's speed, according to an embodiment.

FIG. 13 is a flow chart illustrating an embodiment of a method 1300 for dynamically reducing aerodynamic drag on a vehicle. The method 1300 includes a first step 1310 of receiving, at an onboard computing system for the vehicle, first data, and a second step 1320 of determining that the first data matches a condition corresponding to a first type of triggering event. In addition, a third step 1330 includes deploying, in response to determining a first type of triggering event has occurred, a first aerodynamic apparatus from a chamber formed in a first sidewall of the vehicle. Once deployed, the first aerodynamic apparatus extends between a front wheel and rear wheel of the vehicle.

In other embodiments, the method may include additional steps or aspects. As one example, the first data can correspond to sensory information obtained by a sensor disposed in the vehicle, and the deployment can be automated in response to a particular type and value of sensor data. In another example, the first data corresponds to a first user input requesting the deployment of the first aerodynamic apparatus, such that the deployment is manually activated. In different embodiments, the method also includes steps of receiving, at the onboard computing system, second data corresponding to a second type of triggering event, and then retracting, in response to receiving the second data, the first aerodynamic apparatus into the chamber. The second data can also be either sensor data or a manual user input. In some embodiments, the method can further include a step of deploying a second aerodynamic apparatus from a chamber formed in a second sidewall (on the opposing side) of the vehicle.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. An aerodynamic apparatus for a vehicle comprising:
a first side panel and a second side panel joined along a first tapered edge; and
a first inlet formed in the first side panel and a first outlet formed in the second side panel, wherein the first inlet and first outlet are joined via a first through-hole, wherein an outward-facing surface of the first side panel is substantially planar and an outward-facing surface of the second side panel includes a convex curvature.

2. The aerodynamic apparatus of claim 1, further comprising a top panel extending between a first upper edge of the first side panel and a second upper edge of the second side panel, the top panel being substantially orthogonal relative to both the first side panel and the second side panel.

3. The aerodynamic apparatus of claim 2, further comprising a bottom panel extending between a first lower edge of the first side panel and a second lower edge of the second side panel, the bottom panel being substantially orthogonal relative to both the first side panel and the second side panel.

4. The aerodynamic apparatus of claim 3, further comprising a rear panel extending between the first side panel, the second side panel, the top panel, and the bottom panel, thereby fully enclosing a hollow interior.

5. The aerodynamic apparatus of claim 2, wherein:
the first side panel, second side panel, and top panel collectively comprise a first layer; and
a second layer is stacked directly on the top panel, and the second layer comprises a third side panel and a fourth side panel joined along a second tapered edge.

6. The aerodynamic apparatus of claim 5, wherein a first enclosed volume of the first layer differs from a second enclosed volume of the second layer.

7. The aerodynamic apparatus of claim 5, wherein a first volume of the first layer merges with a second volume of the second layer such that the first layer and second layer together form a substantially continuous interior chamber.

8. The aerodynamic apparatus of claim 1, further comprising a second inlet formed in the second side panel and a second outlet formed in the first side panel, wherein the second inlet and second outlet are joined via a second through-hole.

9. A retractable aerodynamic automotive system configured to reduce aerodynamic drag in a vehicle, the system comprising:
a wedge-shaped first component comprising a first side panel joined to a second side panel along a tapered front edge, the first component being stowed within a first chamber formed in a first side wall of the vehicle when retracted; and
wherein a tip end of the tapered front edge is disposed directly rearward of an inboard side of a front wheel of the vehicle when the first component is deployed, thereby directing airflow away from a rear wheel of the vehicle.

10. The system of claim 9, further comprising a wedge-shaped second component of a similar size and dimensions as the first component, the second component being stowed within a second chamber formed in a second side wall of the vehicle when retracted.

11. The system of claim 9, wherein the first component has a length that extends between the front wheel well and rear wheel well when deployed.

12. The system of claim 9, wherein the first component expands in width as it extends in a longitudinal direction from the front wheel well to the rear wheel well.

13. The system of claim 9, wherein a first rear edge of the first side panel is substantially aligned with an inboard side of the rear wheel and a second rear edge of the second side panel is substantially aligned with an outboard side of the rear wheel.

14. The system of claim 13, wherein the first side panel is substantially planar, and the second side panel includes a convex curvature.

15. The system of claim 9, wherein a first rear edge of the second side panel includes a flare portion.

16. A method of reducing aerodynamic drag on a vehicle, the method comprising:
receiving, at an onboard computing system for the vehicle, first data;
determining that the first data matches a condition corresponding to a first type of triggering event; and
deploying, in response to determining a first type of triggering event has occurred, a first aerodynamic apparatus from a chamber formed in a first sidewall of the vehicle, the first aerodynamic apparatus extending downward between a front wheel and rear wheel and comprising a first side panel joined to a second side panel along a tapered front edge, and a first rear edge of the second side panel includes a flare portion.

17. The method of claim 16, wherein the first data corresponds to sensory information obtained by a sensor disposed in the vehicle.

18. The method of claim 16, wherein the first data corresponds to a first user input requesting the deployment of the first aerodynamic apparatus.

19. The method of claim 16, further comprising:
receiving, at the onboard computing system, second data corresponding to a second type of triggering event; and
retracting, in response to receiving the second data, the first aerodynamic apparatus into the chamber.

20. The method of claim 19, wherein the second data corresponds to a second user input requesting the retraction of the first aerodynamic apparatus.

* * * * *